(12) United States Patent
Qama et al.

(10) Patent No.: US 11,099,036 B2
(45) Date of Patent: Aug. 24, 2021

(54) 360 DEGREE POSITION SENSOR

(71) Applicant: Integrated Device Technology, Inc., San Jose, CA (US)

(72) Inventors: Gentjan Qama, Munich (DE); Marco Nicolò, Munich (DE); L'ubomir Fenic, Munich (DE)

(73) Assignee: Integrated Device Technology, Inc., San Jose, CA (US)

(*) Notice: Subject to any disclaimer, the term of this patent is extended or adjusted under 35 U.S.C. 154(b) by 0 days.

(21) Appl. No.: 16/508,207

(22) Filed: Jul. 10, 2019

(65) Prior Publication Data

US 2021/0010829 A1 Jan. 14, 2021

(51) Int. Cl.
*G01D 5/20* (2006.01)
*G01R 1/00* (2006.01)
*H01L 21/00* (2006.01)

(52) U.S. Cl.
CPC ................. *G01D 5/2053* (2013.01)

(58) Field of Classification Search
CPC ....... H01L 21/00; H01L 2221/00; G01R 1/00; G01D 1/00; H01F 1/00
See application file for complete search history.

(56) References Cited

U.S. PATENT DOCUMENTS

| | | | | |
|---|---|---|---|---|
| 2013/0041622 A1* | 2/2013 | Lu | ........................... | G01M 1/00 702/151 |
| 2013/0215511 A1* | 8/2013 | Wu | ..................... | H04N 5/23287 359/554 |
| 2014/0092265 A1* | 4/2014 | Hsu | ...................... | H04N 5/2257 348/208.7 |
| 2016/0363488 A1* | 12/2016 | Sipila | ................... | G01R 33/091 |
| 2017/0336192 A1* | 11/2017 | Moser | .................... | G01B 7/003 |
| 2019/0226877 A1* | 7/2019 | Kluge | ................... | G01D 5/2053 |

\* cited by examiner

*Primary Examiner* — Jermele M Hollington
*Assistant Examiner* — Temilade S Rhodes-Vivour
(74) *Attorney, Agent, or Firm* — Haynes and Boone, LLP

(57) ABSTRACT

An accurate position sensor is presented. The sensor operates over 360-degree motion angular motion and includes a coil structure formed on a substrate and a target mounted to be angularly moved over the coil structure, the target being formed of a conducting material in a shape of a spiral of Archimedes. The coil structure includes coils with an arc sufficient to operate over a 360 degree motion of the target, for example between 120 degrees and 360 degrees. Some embodiments include coils with a 180 degree arc. A method of operating the position sensor includes rotating a target formed of a conducting material in a shape of a spiral of Archimedes over a coil structure and providing a linearized and calibrated response indicating the angular position of the target relative to the coil structure.

12 Claims, 4 Drawing Sheets

360 DEGREE POSITION SENSOR

TECHNICAL FIELD

Embodiments of the present invention are related to position sensors and, in particular, to a 360 degree position sensor that uses sensor coils with a smaller than 360 degree sensor arc.

DISCUSSION OF RELATED ART

Position sensors are used in various settings for measuring the position of one component with respect to another. Inductive position sensors can be used in automotive, industrial and consumer applications for absolute rotary and linear motion sensing. In many inductive positioning sensing systems, a transmit coil is used to induce eddy currents in a metallic target that is sliding or rotating above a set of receiver coils. Receiver coils receive the magnetic field generated from eddy currents and the transmit coils and provide signals to a processor. The processor uses the signals from the receiver coils to determine the position of the metallic target above the set of coils. The processor, transmitter, and receiver coils may all be formed on a printed circuit board (PCB).

One of the most challenging aspects of providing an inductive position sensor is providing coils on a printed circuit board (PCB) while adhering to customer requests. In many cases, the inductive position sensor is a replacement of an older technology (magnetic sensing, hall-effect sensors, or other technology) and consequently the form-factor of the inductive position sensor should closely match that of the technology that it is replacing. Inductive technology requires coils (sensor coils and transmit coils) mounted on a PCB, which often takes more space than was required by the technology that it is replacing. Further, because of the mechanical vibration that may be present, the mounting requirements may use even more PCB space.

Therefore, there is a need to develop better inductive position sensing technologies that uses less PCB space.

SUMMARY

An accurate position sensor that operates over 360-degree motion is presented. The position sensor includes a coil structure formed on a substrate; and a target mounted to be angularly moved over the coil structure, the target being formed of a conducting material in a shape of a spiral of Archimedes. The coil structure is less than 360 degrees, for example a 180-degree coil structure.

A method of operating a position sensor according to some embodiments includes rotating a target formed of a conducting material in a shape of a spiral of Archimedes over a coil structure; and providing a linearized and calibrated response indicating the angular position of the target relative to the coil structure.

These and other embodiments are discussed below with respect to the following figures.

These and other aspects of embodiments of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Embodiments of the present invention include a 360 degree inductive position sensor where the sensor coils form an arc on a printed circuit board (PCB). The arc of the sensor coils can be as low as a 120 degree arc and is less than 360 degrees. The target is formed with a conductive material in the shape of a spiral of Archimedes. In that case, the signal read from a arc of sensor coils can be used to determine a 360 degree rotation of the target.

Figure 1A:
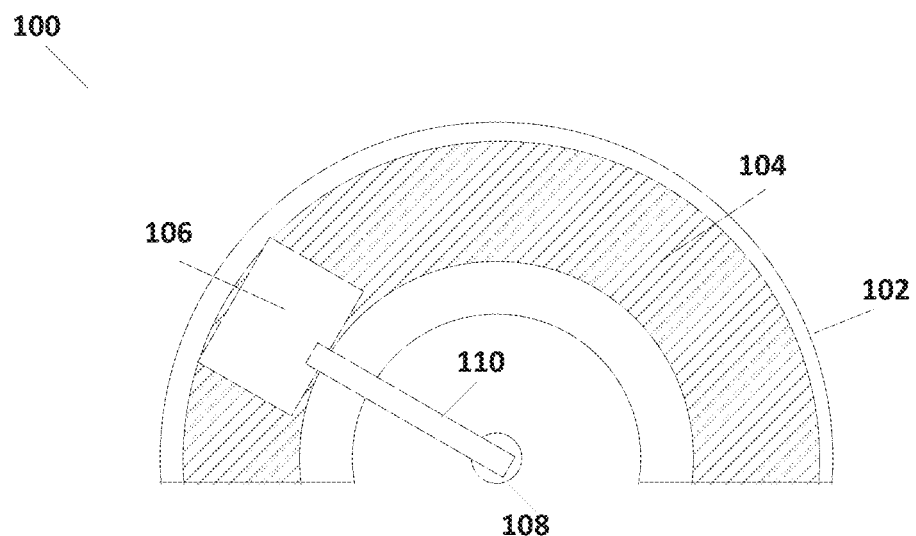
FIGS. 1A and 1B illustrates an example angular position sensor.

FIG. 1A illustrates a conventional inductive angular position sensor 100. Position sensor 100 includes a substrate 102 on which coils 104 are formed. Coils 104 can include a transmission coil coupled to generate an electromagnetic field along with sensor coils, for example a sine coil and a cosine coil, that detect fields from target 106. As illustrated in FIG. 1A, position sensor 100 is operable to measure, for example, a 180 degree rotation of target 106 around pivot point 108. In some embodiments, target 106 may be coupled to pivot point 108 by arm 110. Coils 104 can include other arc configurations as well. As target 106 is rotated over coils 104, the angular position of target 106 is determined by the signals from the sensor coils.

Figure 1B:
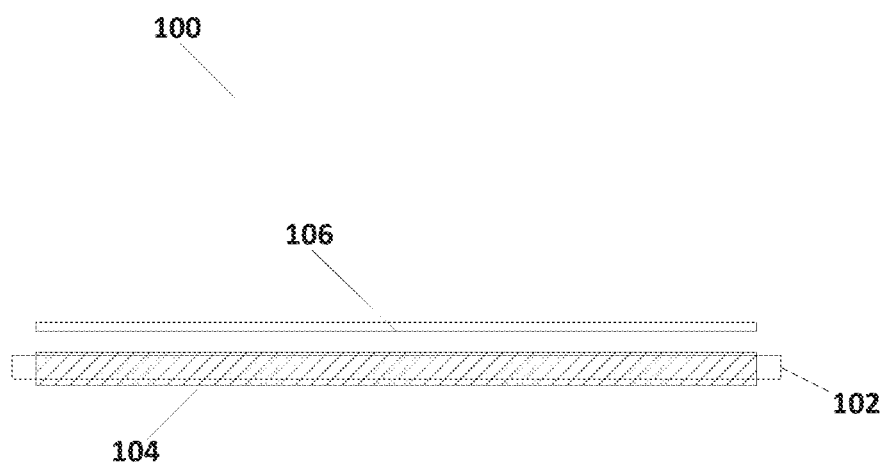

FIG. 1B illustrates a cross section of position sensor 100 as illustrated in FIG. 1A. As illustrated, coils 104 are formed on a substrate 102, which may be a printed circuit board (PCB). Coils 104, which typically includes a transmit coil, a sine sensor coil, and a cosine sensor coil, are arranged on a top and bottom surface of substrate 102 with vias through substrate 102 forming connections between traces formed on the top and bottom surfaces. Target 106 is positioned above substrate 102 at a separation distance. Signals from sensor coils of coils 104 can then be used to determine the position of target 106 relative to the sensor coils.

As illustrated in FIG. 1A, a 360 degree position sensor can be formed with a 360 degree positioning position where the sensor coils are formed in a 360 degree arc. However, as discussed above, this arrangement requires a much larger printed circuit board and more space than may be available.

Figure 2A:
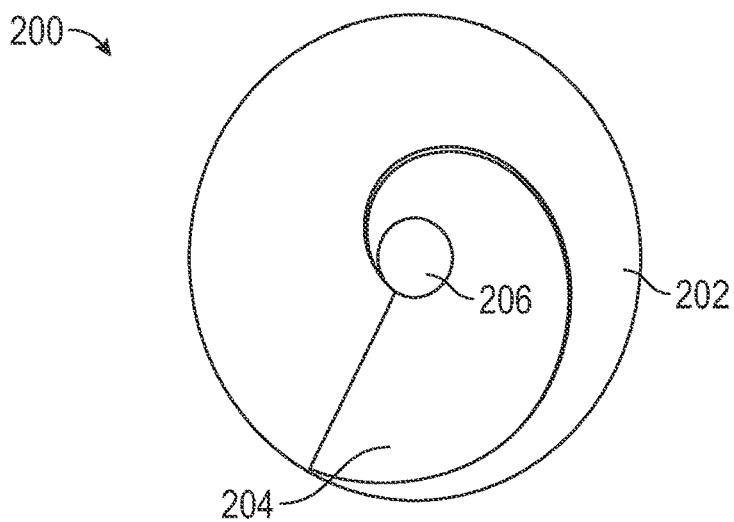
FIGS. 2A and 2B illustrate a position sensor according to some embodiments of the present invention.
Figure 2B:
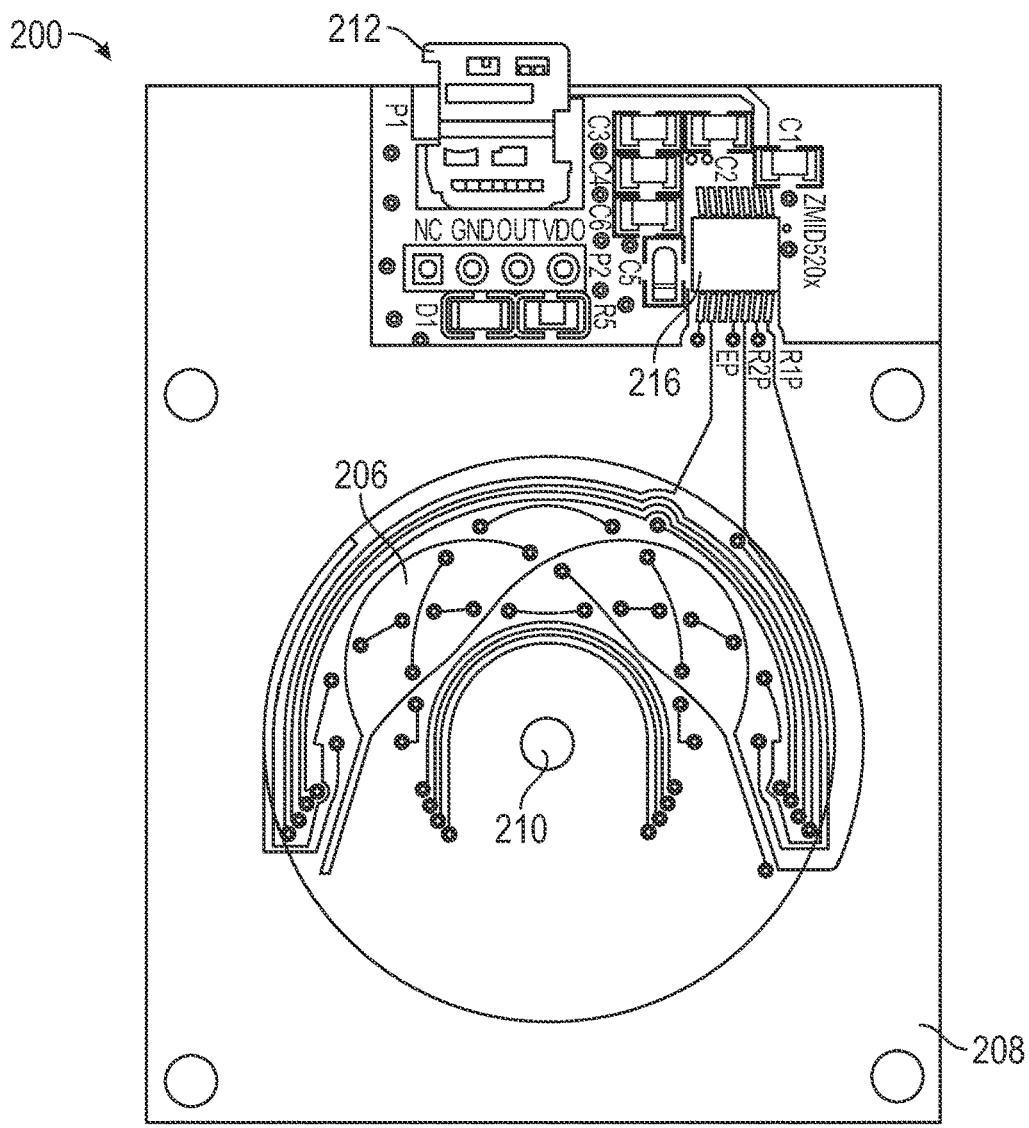

FIGS. 2A and 2B illustrate an embodiment of a position sensor 200 according to some embodiments of the present invention. FIG. 2A illustrates an example target while FIG. 2B illustrates a coil design over which the target illustrated in FIG. 2A is rotated.

As illustrated in FIG. 2A, a conductive material target 202 is mounted on a substrate 204, which may be any rigid non-conducting material such as printed circuit board. Target 202 is formed in the shape of an Archimedes spiral around a center mounting hole 206. Center mounting hole 206 can have an inner diameter of ID. The outer diameter of target 202 is given by OD. In that case, the inner radius as a function of angle θ in radians can be given by $$R_{IN}=(OD-ID)*\theta/(2\pi)+ID$$

The outer radius of the metallization of target 202 is OD. Consequently, target 202 includes a great deal more metal than more conventional targets.

FIG. 2B illustrates a printed circuit board 208 on which coils 206 are formed. As illustrated in FIG. 2B, coils 206 form an arc that is less than 360 degrees. The arc of the sensor coils of coils 206 is sufficient that, when target 202 is rotated from 0 to 360 degrees, the arc of the sensor coils is sufficient to monitor the full range of rotation of target 202. In some embodiments, the arc of the sensor coils of coils 206 can be, for example, as low as 120 degrees. In some embodiments, the arc of the sensor coils can be 180 degrees.

As is further illustrated in FIG. 2B, a transmitter/receiver circuit 216 and an external connecter 212 is illustrated. Transmitter/receiver circuit 216 receives power through external connector 212 and drives transmit coil while receiving signals from receive coils of coils 206. The received signals can also be transmitted through external connector 212 for further processing. A hole 210 is formed through which target 202 is coupled and rotates around.

As illustrated in FIG. 2B, circuit 216 can drive the transmit coil and receive signals from sin and cos coils that are included in coils 206. Circuit 216 may further process these received sensor signals into a response that is provided to external circuitry through external connector 212. External circuitry may include dedicated circuits or include microcontrollers, processors, other digital processing circuitry. Low angular speeds of target 202 can be monitored effectively digitally. However, faster angular speeds may use further analog processing to determine accurate position measurements.

Consequently, the resulting position sensor 200 can be arranged to take minimum space. On packaging, for example, would only have coils 206 and target 202 mounted together while circuit 216 and other circuitry are mounted proximate to the package. Arrangements can be made to accommodate a multitude of applications.

Figure 3:
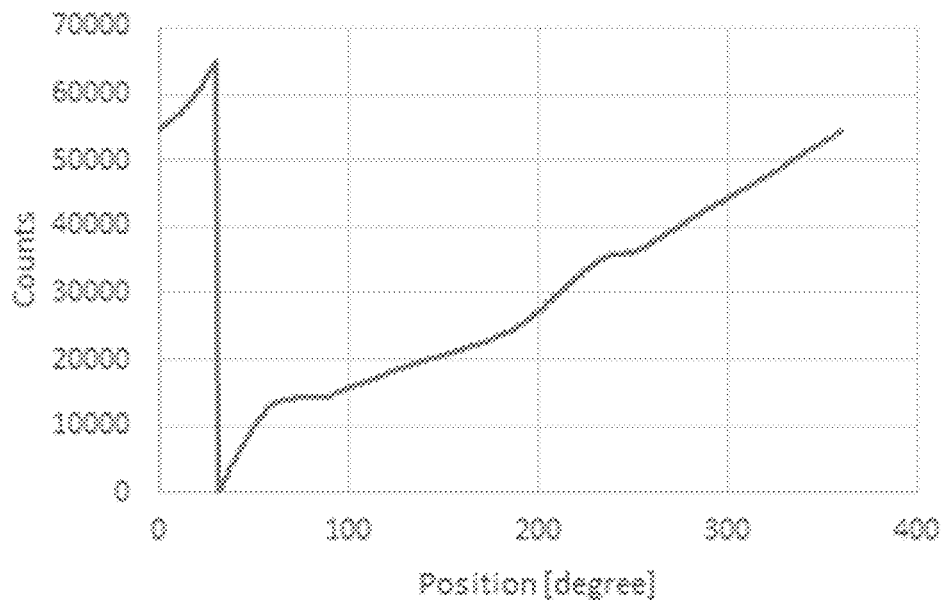
FIG. 3 illustrates the response of a position sensor such as that illustrated in FIGS. 2A and 2B.

FIG. 3 illustrates the angular response of an example position sensor 200 as illustrated in FIGS. 2A and 2B with a sensor coil arc of 180 degrees. FIG. 3 illustrates the signal as a function of angle as target 202 is rotated over coils 206. Using the spiral of Archimedes shaped target 202 results in a continuous decrease of conductor (usually copper) over the sine and cosine receive coils of coils 206. This arrangement is converted to sin and cos output signals as target 202 is angularly rotated over coils 206. The signal response is illustrated in FIG. 3. The "jump" in the response can be removed through a calibration of the system. As a result, a calibration and linearization step can be performed such that the resulting response of an embodiment of the position sensor is accurate.

Figure 4:
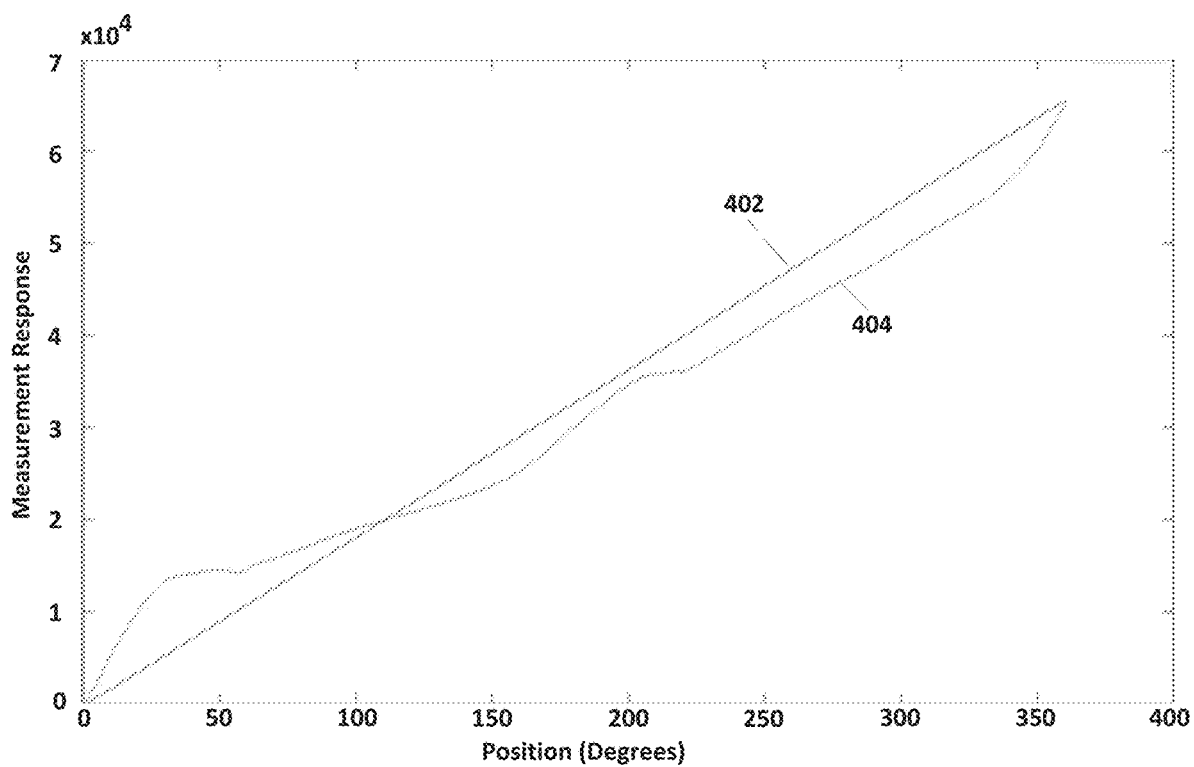
FIG. 4 further illustrates response as a function of position for the position sensor such as that illustrated in FIGS. 2A and 2B.
Figure 5:
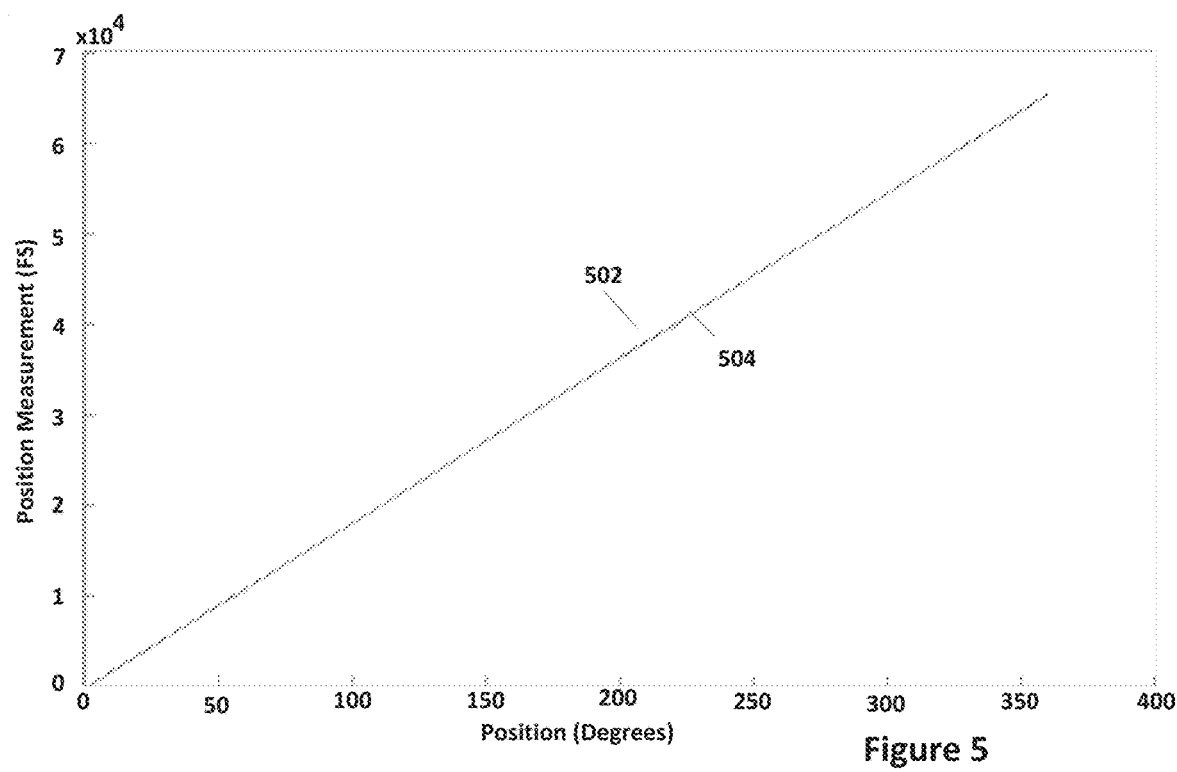
FIG. 5 illustrates a linearized response as a function of position for the position sensor such as that illustrated in FIGS. 2A and 2B.
Figure 6:
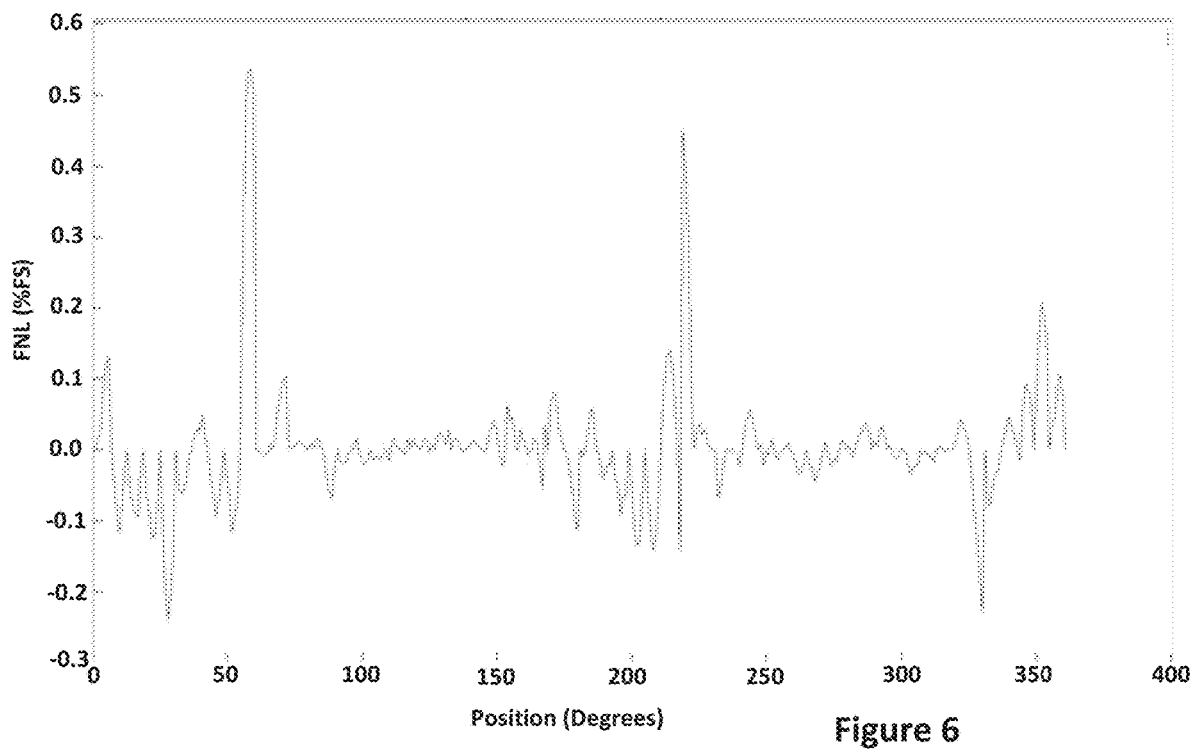
FIG. 6 illustrates an error in percentage of full scale response (FS) as a function of angular position for a position sensor as illustrated in FIGS. 2A and 2B.

FIG. 4 illustrates an example response of position sensor 200 as a function of angular position. As shown in FIG. 4, the ideal curve 402 is a linear response to angular position. Curve 404 illustrates the actual response after the "jump" illustrated in FIG. 3 is removed. As illustrated in FIG. 4, in this example the error in curve 404 from the ideal curve 402 amounts to about 12% Full Scale (FS). FIG. 5 illustrates the fully calibrated and linearized response where the response curve 504 matches the idealized response curve 502. FIG. 6 illustrates the error in the linearized response 504 from the ideal curve 402 illustrated in FIG. 5. As illustrated in FIG. 6, the linearized and calibrated response curve 504 has an error of about 0.5% FS.

In some embodiments, numerous points can be used for correction. In the example illustrated in FIGS. 4 and 5, a 61 fixed point correction was used to linearize the data. Any number of fixed point correction points can be used to calibrate and linearize the response of position sensor 200 as a function angular position of target 202. In embodiments of the invention, position sensor 200 can be calibrated and linearized with an external processor and calibration data reloaded into circuit 210 so that the output response is linear.

As a result, using a 180 degree coil structure and a target shaped as a spiral of Archimedes, a resulting highly accurate 360 degree angular position sensor is formed. In some embodiments, a variable correction point system rather than a fixed variable point system can be used in linearization, which may result in an even lower (<0.2% FS) may be achieved. Embodiments can be particularly useful in a slow rotational speed application where microcontrollers can be most effective. However, embodiments can be used in systems with higher rotational speeds as well.

The above detailed description is provided to illustrate specific embodiments of the present invention and is not intended to be limiting. Numerous variations and modifications within the scope of the present invention are possible. The present invention is set forth in the following claims.

What is claimed is:

1. A rotational position sensor, comprising:
a coil structure formed on a substrate, the coil structure being formed in an arc around a center mounting hole in the substrate;
a target formed of a conducting material mounted on a target substrate and configured to be angularly rotated at a separation distance over the coil structure, the conducting material being in a shape of a spiral of Archimedes around a target center mounting hole in the target substrate; and
a circuit coupled to the coil structure, the circuit configured to determine a position of the target as the target is rotated through a 360° rotation over the coil structure.

2. The position sensor of claim 1, wherein the coil structure includes coils with the arc being a 180 degree arc.

3. The position sensor of claim 1, wherein the coil structure includes coils with the arc being between 120 degrees and 360 degrees.

4. The position sensor of claim 1, wherein the coil structure includes a transmit coil, a sin sensor coil, and a cos sensor coil.

5. The position sensor of claim 1, wherein the conducting material in the shape of a spiral of Archimedes has an outer diameter OD and an inner radius $R_{IN}$ given by $R_{IN}=(OD-ID)*\theta/(2\pi)+ID$, where ID represents the inner diameter and θ is the angular position in radians.

6. The position sensor of claim 4, wherein the circuit is mounted on the substrate, drives the transmit coil and receives signals from the sin sensor coil and the cos sensor coil.

7. The position sensor of claim 1, further including external circuitry coupled to the circuit, the external circuitry providing linearized and calibrated data.

8. A method of operating a rotational position sensor, comprising:

rotating a target formed of a conducting material in a shape of a spiral of Archimedes over a coil structure, the conducting material of the target being formed on a substrate around a target center mounting hole, the coil structure being formed on a substrate in an arc around a center mounting hole aligned with the target center mounting hole;

driving a transmitter coil that is included in the coil structure;

receiving signals related to the rotational location of the target relative to the coil structure from receiver coils that are included in the coil structure;

providing a linearized and calibrated response from the signals indicating the angular position of the target relative to the coil structure.

9. The method of claim 8, wherein the arc of the coil structure is 180 degrees.

10. The method of claim 8, wherein the arc of the coil structure is between 120 degrees and 360 degrees.

11. The method of claim 8, wherein the coil structure includes the transmit and the receive coils include a sin sensor coil and a cos sensor coil.

12. The method of claim 8, wherein the conducting material in the shape is given by an outer diameter OD and an inner radius $R_{IN}$ given by $R_{IN}=(OD-ID)*\theta/2\pi)+ID$, where ID represents the inner diameter and $\theta$ is the angular position in radians.

* * * * *